(12) United States Patent
Lee et al.

(10) Patent No.: US 11,559,862 B1
(45) Date of Patent: Jan. 24, 2023

(54) POWER TOOL

(71) Applicants: HYUNDAI MOTOR COMPANY, Seoul (KR); KIA CORPORATION, Seoul (KR)

(72) Inventors: Yong Cheol Lee, Yongin-si (KR); Hyung Jong Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/720,009

(22) Filed: Apr. 13, 2022

(30) Foreign Application Priority Data

Jul. 21, 2021 (KR) .......................... 10-2021-0096006

(51) Int. Cl.
*B23P 19/06* (2006.01)
*B60S 5/00* (2006.01)

(52) U.S. Cl.
CPC ................. *B23P 19/06* (2013.01); *B60S 5/00* (2013.01)

(58) Field of Classification Search
CPC . B23P 19/06; B60S 5/00; B62D 17/00; B62D 19/00; B25B 13/488; B25B 13/481; B25B 13/56; B25B 25/00
See application file for complete search history.

(56) References Cited

U.S. PATENT DOCUMENTS

| | | | |
|---|---|---|---|
| 8,015,901 B2 * | 9/2011 | Kanazawa | B25B 21/002 81/57.2 |
| 8,082,822 B2 | 12/2011 | Hoenke | |
| 8,408,618 B2 | 4/2013 | Unmuth et al. | |
| 8,443,503 B2 | 5/2013 | Park | |
| 10,279,442 B2 | 5/2019 | Apold et al. | |
| 11,185,976 B2 | 11/2021 | Lee | |
| 2021/0094169 A1 | 4/2021 | Lee | |

FOREIGN PATENT DOCUMENTS

| | | |
|---|---|---|
| JP | 2913252 B2 | 6/1999 |
| JP | 2020-093720 A | 6/2020 |
| KR | 960004345 B1 | 4/1996 |
| KR | 2021-0037900 A | 4/2021 |

OTHER PUBLICATIONS

Fori Automation News, Newsletter, vol. 3, No. 1, pp. 1-12.
Fori Automation Inc., Newsletter, Aug. 2013, pp. 1-15.

* cited by examiner

*Primary Examiner* — Lee A Holly
(74) *Attorney, Agent, or Firm* — McDonnell Boehnen Hulbert & Berghoff LLP

(57) ABSTRACT

A power tool includes a wrench head having a rotary socket, and a spanner tool mounted in the rotary socket, wherein the rotary socket grips a first component and the spanner tool grips a second components, the first and second component being adjacent.

20 Claims, 21 Drawing Sheets

POWER TOOL

CROSS REFERENCE TO RELATED APPLICATIONS

This application is based on and claims the benefit of priority to Korean Patent Application No. 10-2021-0096006, filed on Jul. 21, 2021, in the Korean Intellectual Property Office, the disclosure of which is incorporated herein in its entirety by reference.

TECHNICAL FIELD

The present disclosure relates to a power tool having a relatively lightweight and simple structure.

BACKGROUND

Wheel alignment controls the steering performance of front wheels while the vehicle is driving. If the wheels are misaligned, the lifetime of tires may be shortened and the vehicle performance and fuel efficiency may be reduced.

Basically, the wheel alignment is characterized by the caster, camber, and toe.

The caster refers to the angular displacement (forward or backward tilt) of a steering axis from a vertical axis of a steered wheel as seen from the side of the vehicle. The caster is an essential element to ensure the vehicle's straight-line stability. As the caster is reduced, the return of a steering wheel may be improved and directional instability may be prevented. However, agile cornering performance may be reduced.

The camber reduces tire wear and to improve handling qualities. The camber may be of three types: negative camber, positive camber, and neutral camber depending on wheel orientation (the angle at which the top or bottom of the wheels (tires) get deformed inwards or outwards on the vertical axis of the vehicle). Most recent vehicles have the negative camber due to the development of suspension and vehicle body technologies. When the negative camber is applied, the vehicle body tilts due to a centrifugal force when cornering, and at this time, a contact area between the outer tire and the ground increases, enabling stable cornering.

The toe refers to the front of the wheels in a direction of travel when viewed from above. When the front of the tires point towards the centerline of the vehicle, it is called toe-in, and when the front of the tires point away from the centerline of the vehicle, it is called toe-out. Excess toe-out may cause the inside edges of the tires to wear out, and excess toe-in may cause the outside edges of the tires to wear out. In both cases, a lot of resistance from the road surface may reduce ride quality and reduce fuel efficiency. Proper toe-in may increase straight-line stability and make up for the inside tire wear caused by negative camber.

As well known in the art, toe settings may be adjusted by adjusting the lengths of tie rod assemblies of a steering mechanism. The steering mechanism includes a steering rack and pinion (or steering center link) and a pair of tie rod assemblies pivotally connected to both ends of the steering rack and pinion. The tie rod assemblies transmit a force from the steering rack and pinion to knuckles of the wheels, each tie rod assembly including an inner tie rod and an outer tie rod. The inner tie rod may have external threads provided on an end portion thereof and a hex portion adjacent to the external threads, and the outer tie rod may have internal threads provided on an end portion thereof. The external threads of the inner tie rod may be screwed into the internal threads of the outer tie rod. As the external threads of the inner tie rod move along an axial direction of the internal threads of the outer tie rod by rotation of the inner tie rod, the overall length of each tie rod assembly may be adjusted. When a lock nut is screwed to the external threads of the inner tie rod, and the lock nut locks the external threads of the inner tie rod and the internal threads of the outer tie rod, the external threads of the inner tie rod and the internal threads of the outer tie rod may be prevented from rotating relative to each other. Specifically, a power tool such as a nut runner may selectively grip and rotate the lock nut and the hex portion of the inner tie rod in the tie rod assembly of the steering mechanism to thereby adjust the overall length of the tie rod assembly, and thus the toe settings may be adjusted.

However, the power tool according to the related art may selectively grip the outer tie rod, the hex portion of the inner tie rod, and the lock nut and selectively rotate the inner tie rod and the lock nut. In particular, since the lock nut and the inner tie rod have different outer diameters, a structure of the power tool for selectively gripping the lock nut and the inner tie rod may become complex. That is, the related art power tool has a very complex structure and requires relatively many components, and thus has a relatively heavy weight and a relatively large size. Accordingly, the related art power tool may cooperate with a robot having a high payload capacity. The power tool and the robot are large and heavy, so it may be difficult to install them in a narrow space of wheel alignment measuring equipment. In addition, a time required for maintenance and repair may be relatively increased in the narrow space of the wheel alignment measuring equipment, and thus work productivity may be reduced.

In addition, a toe adjustment tool according to the related art requires relatively many components, so the possibility of failure may be high and a wheel alignment time may also be relatively long.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a power tool having a relatively lightweight and compact structure by simplifying its structure for selective grip and rotation with respect to different components.

According to an aspect of the present disclosure, a power tool may include a wrench head having a rotary socket, and a spanner tool mounted in the rotary socket. The rotary socket and the spanner tool may grip adjacent first and second components, respectively.

Since the spanner tool is mounted in the rotary socket, and the rotary socket and the spanner tool are able to grip the adjacent first and second components, respectively, the assembly, adjustment, and setting of various components may be efficiently and easily performed, and the power tool may be designed to have a lightweight simple structure.

The rotary socket may have a first open recess, and a plurality of inner flat surfaces by which the first open recess is defined, and the first component may have a plurality of flat surfaces.

When the first component is received in the first open recess, the plurality of inner flat surfaces may accurately grip the flat surfaces of the first component.

The spanner tool may include a tool housing mounted in the rotary socket, and a spanner member movably mounted in the tool housing to move between an ungrip position in which the spanner member ungrips the second component and a grip position in which the spanner member grips the second component.

As the spanner member moves between the grip position and the ungrip position in the tool housing, it may be able to easily grip and ungrip the second component. In particular, in a state in which the rotary socket grips the first component, the spanner member may grip or ungrip the second component.

The tool housing may have a second open recess, and the spanner member may have a third open recess. The second open recess may be aligned with the first open recess, and the second open recess may be larger than the third open recess. When the spanner member is in the ungrip position, the third open recess may be out of the second open recess. When the spanner member is in the grip position, the third open recess may be positioned within the second open recess.

Considering that the second open recess of the tool housing is aligned with the first open recess of the rotary socket, when the first open recess grips the first component, the second open recess receives the second component, but does not grip the second component. As the spanner member moves between the grip position and the ungrip position, the spanner member may grip and ungrip the second component received in the second open recess.

The tool housing may have a slot in which the spanner member is movably received, and the slot may have a shape corresponding to that of the spanner member.

As the spanner member moves between the ungrip position and the grip position along the slot of the tool housing, the movement of the spanner member may be accurately guided by the slot.

The spanner tool may further include a spring causing the spanner member to be biased to the ungrip position.

The spanner tool may be maintained in the ungrip position by the spring when it is not necessary to grip the second component, and the spanner member may move from the ungrip position to the grip position only when it is necessary to grip the second component.

The spanner tool may further include a stopper member restricting the spanner member to the ungrip position, and the stopper member may be mounted to the tool housing.

The spanner member may have a guide groove, and the guide groove may have a stopper surface provided on a top end thereof. The stopper member may have a stopper projection received in the guide groove of the spanner member. As the stopper projection comes into contact with the stopper surface, the spanner member may be restricted to the ungrip position.

Since the stopper member restricts the spanner member to the ungrip position, the spanner member may be prevented from being completely separated from the tool housing.

The stopper member may have a mounting projection, and the stopper projection may protrude from the mounting projection. The tool housing may have a mounting hole into which the mounting projection of the stopper member is fitted, the mounting hole may communicate with the slot, and the guide groove may face the mounting hole.

As the mounting projection of the stopper member is press-fitted into the mounting hole of the tool housing, the stopper projection may be received in the guide groove of the spanner member, and the stopper member may be easily and accurately mounted to the tool housing.

The power tool may further include a first gripper gripping and ungripping an outer circumferential surface of the spanner tool. As the first gripper ungrips the outer circumferential surface of the spanner tool, the spanner member may move toward the ungrip position, and as the first gripper grips the outer circumferential surface of the spanner tool, the spanner member may move toward the grip position.

As the first gripper grips or ungrips the outer circumferential surface of the spanner tool, the spanner member of the spanner tool may accurately move to the grip position or the ungrip position.

The first gripper may include a first actuator and a pair of first grip members moved by the first actuator. The pair of first grip members may move between an ungrip position in which the first grip members ungrip the outer circumferential surface of the spanner tool and a grip position in which the first grip members grip the outer circumferential surface of the spanner tool.

The pair of first grip members may face each other to surround the outer circumferential surface of the spanner tool.

The pair of first grip members may grip and ungrip the entirety of the outer circumferential surface of the spanner tool, and thus the movement of the spanner member may be accurately performed.

The first gripper may further include a pair of first guide portions provided on top ends of the pair of first grip members, respectively.

Each first guide portion and a corresponding first grip member may form a unitary one-piece structure, and the first guide portion may have a first tapered surface guiding the second component gripped by the spanner member.

Accordingly, the second component may be accurately guided to the spanner member through the first tapered surfaces of the first guide portions, and thus the spanner member may accurately grip the second component.

The first guide portion may extend from the top end of the corresponding first grip member to cover the top of the wrench head.

As the first guide portions extends from the top ends of the first grip members to the top of the wrench head, the second component may be guided toward the spanner member and the first component may also be guided toward the rotary socket.

The power tool may further include a second gripper gripping and releasing a third component adjacent to the first component.

When the second gripper grips the third component, the wrench head may rotate the first component more accurately and stably.

The second gripper may include a second actuator and a pair of second grip members moved by the second actuator.

The pair of second grip members may face each other to surround an outer surface of the third component.

The pair of second grip members may grip and ungrip the entirety of the outer surface of the third component, and thus the rotary socket may rotate the first component more accurately and stably.

The second gripper may further include a pair of second guide portions provided on top ends of the pair of second grip members, respectively. Each second guide portion and a corresponding second grip member may form a unitary one-piece structure, and the second guide portion may have a second tapered surface guiding the third component.

Accordingly, the third component may be accurately guided and positioned between the pair of second grip members through the second tapered surfaces of the second guide portions.

The power tool may further include a supporting body extending from the wrench head. The wrench head and the supporting body may be mounted on an arm of a robot through a bracket assembly.

As the spanner tool is mounted in the rotary socket of the wrench head, the structure of the power tool for gripping two or more different components may become compact, and thus the weight thereof may be relatively reduced. Accordingly, a small robot having a relatively low payload may be used. The power tool together with the small robot may be designed to have a small overall size, making it easy to install them in a narrow space of wheel alignment measuring equipment.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
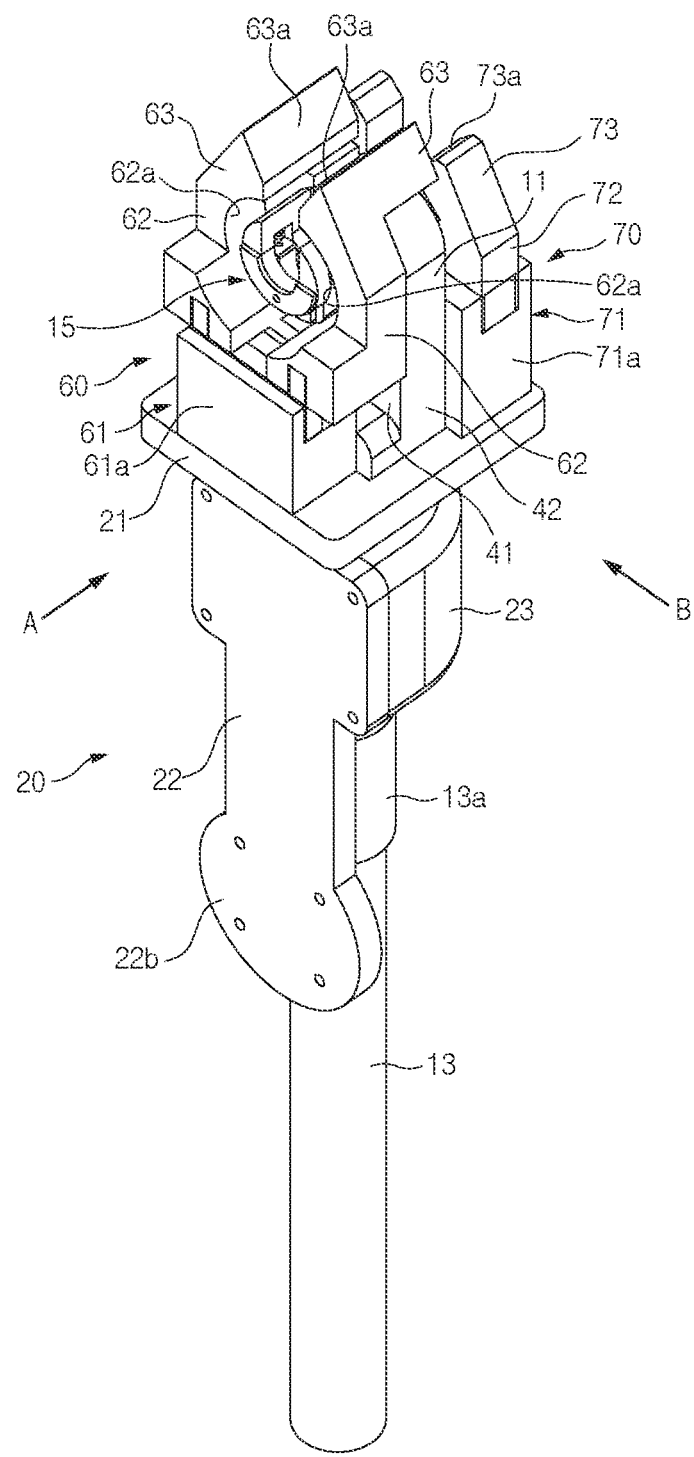
FIG. 1 illustrates a perspective view of a power tool according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a power tool 10 according to an exemplary embodiment of the present disclosure may include a wrench head 11 having a rotary socket 12, and a spanner tool 15 mounted in the rotary socket 12.

Figure 4:
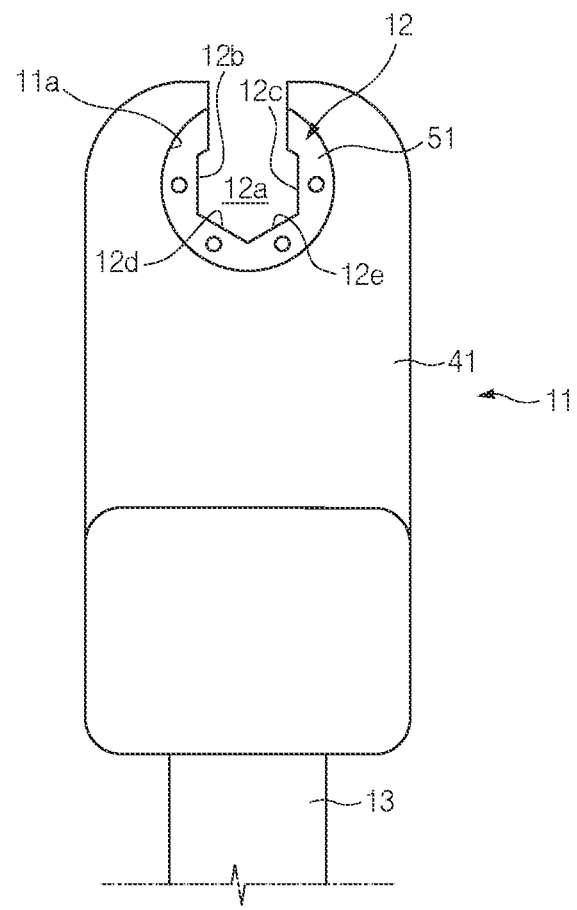
FIG. 4 illustrates a wrench head of a power tool according to an exemplary embodiment of the present disclosure.
Figure 5:
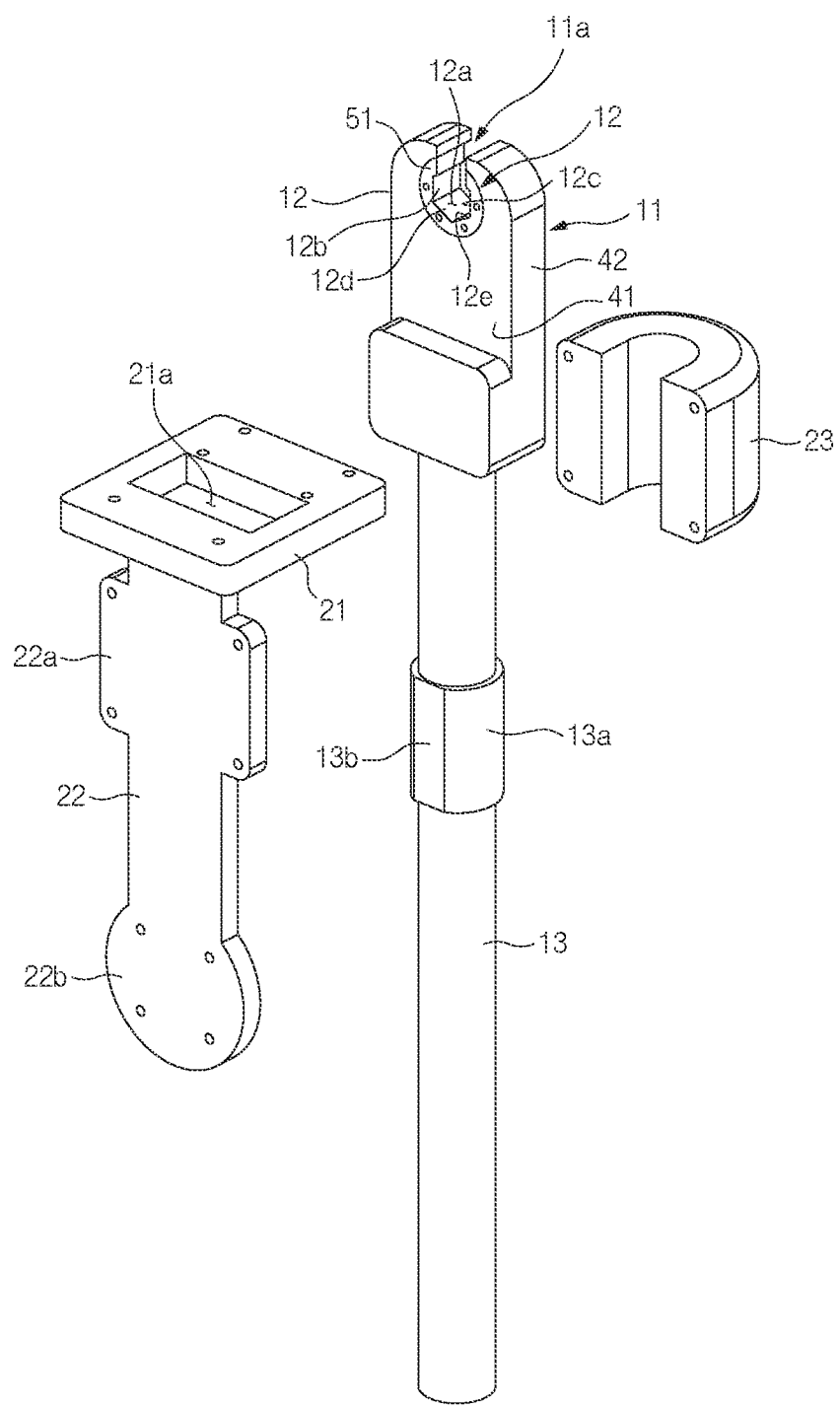
FIG. 5 illustrates an exploded perspective view of a wrench head of a power tool according to an exemplary embodiment of the present disclosure, which is separated from a bracket assembly.

Referring to FIGS. 4 and 5, the wrench head 11 may be mounted on a top end of a supporting body 13, and the wrench head 11 may include the rotary socket 12 which is rotatable. The rotary socket 12 may have a circular shape having a first open recess 12a, and a first component may be received in and gripped by the first open recess 12a of the rotary socket 12. The rotary socket 12 may have a plurality of inner flat surfaces 12b, 12c, 12d, and 12e by which the first open recess 12a is defined, and the inner flat surfaces 12b, 12c, 12d, and 12e of the rotary socket 12 may grip flat surfaces of a flatted portion of the first component. When the first component is received in the first open recess 12a, the plurality of inner flat surfaces 12b, 12c, 12d, and 12e may grip the first component. According to an exemplary embodiment, the first open recess 12a may be defined by the four inner flat surfaces 12b, 12c, 12d, and 12e able to grip a hex portion of the first component.

The first open recess 12a of the rotary socket 12 may have a size and a shape that match those of the first component, and the rotary socket 12 may rotate the first component having a plurality of flat surfaces, such as a nut or a bolt, to loosen or tighten the first component.

Figure 16:
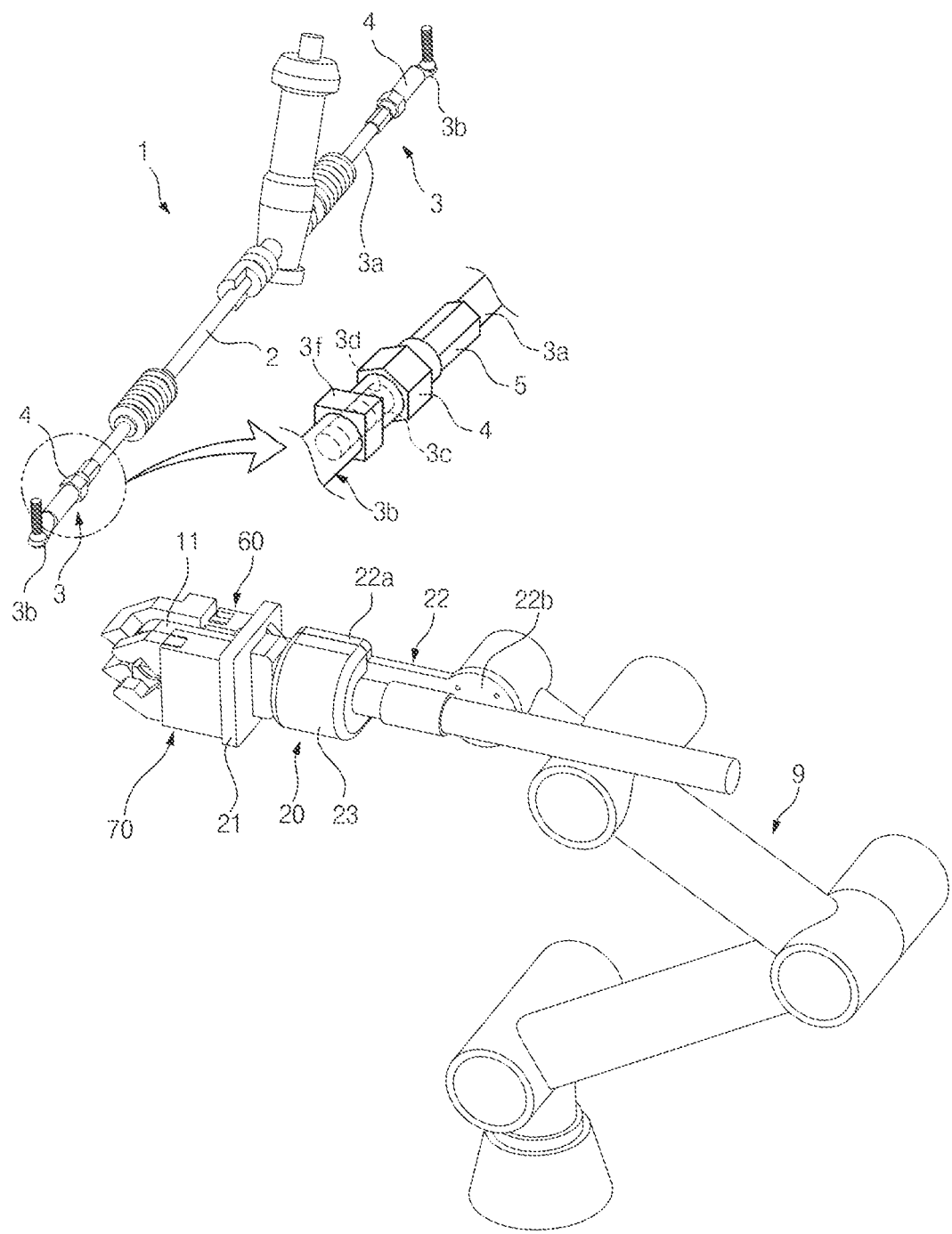
FIG. 16 illustrates a state in which a power tool according to an exemplary embodiment of the present disclosure is separated from a tie rod assembly by a robot.

According to an exemplary embodiment, the first component may have a flatted portion having a plurality of flat surfaces such as a hex portion. For example, as illustrated in FIG. 16, the first component may be a lock nut 4 of a tie rod assembly 3 of a steering mechanism 1. The lock nut 4 may have a hex portion having six flat surfaces. The lock nut 4 of the tie rod assembly 3 of the steering mechanism 1 may be received in the first open recess 12a of the rotary socket 12. When the lock nut 4 is received in the first open recess 12a of the rotary socket 12, the lock nut 4 may be gripped by the inner flat surfaces 12b, 12c, 12d, and 12e of the rotary socket 12.

Figure 6:
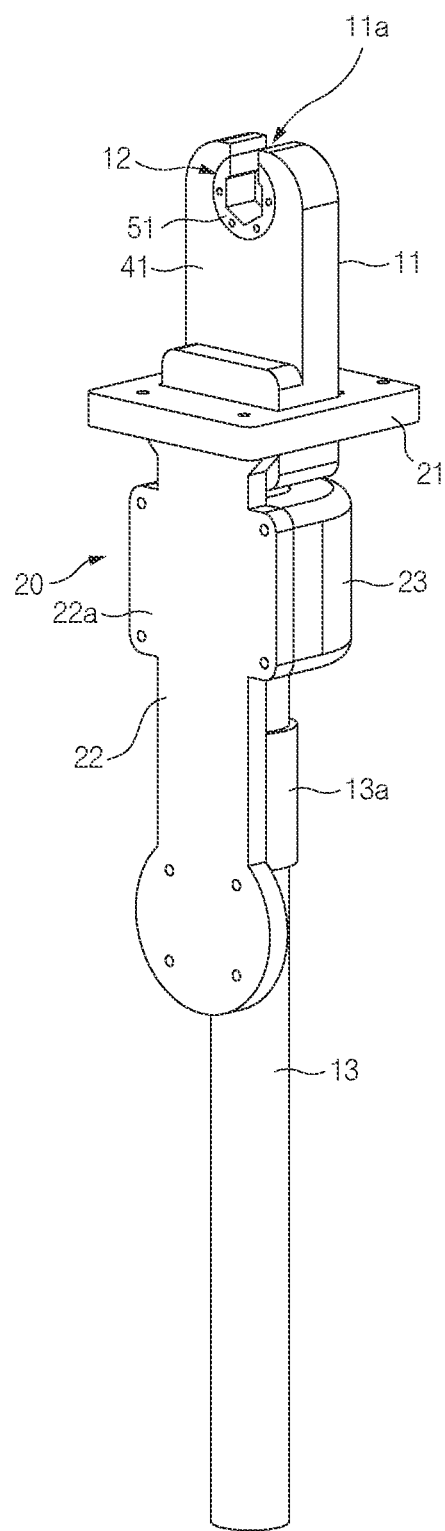
FIG. 6 illustrates a perspective view of a wrench head of a power tool according to an exemplary embodiment of the present disclosure, which is mounted on a bracket assembly.
Figure 9:
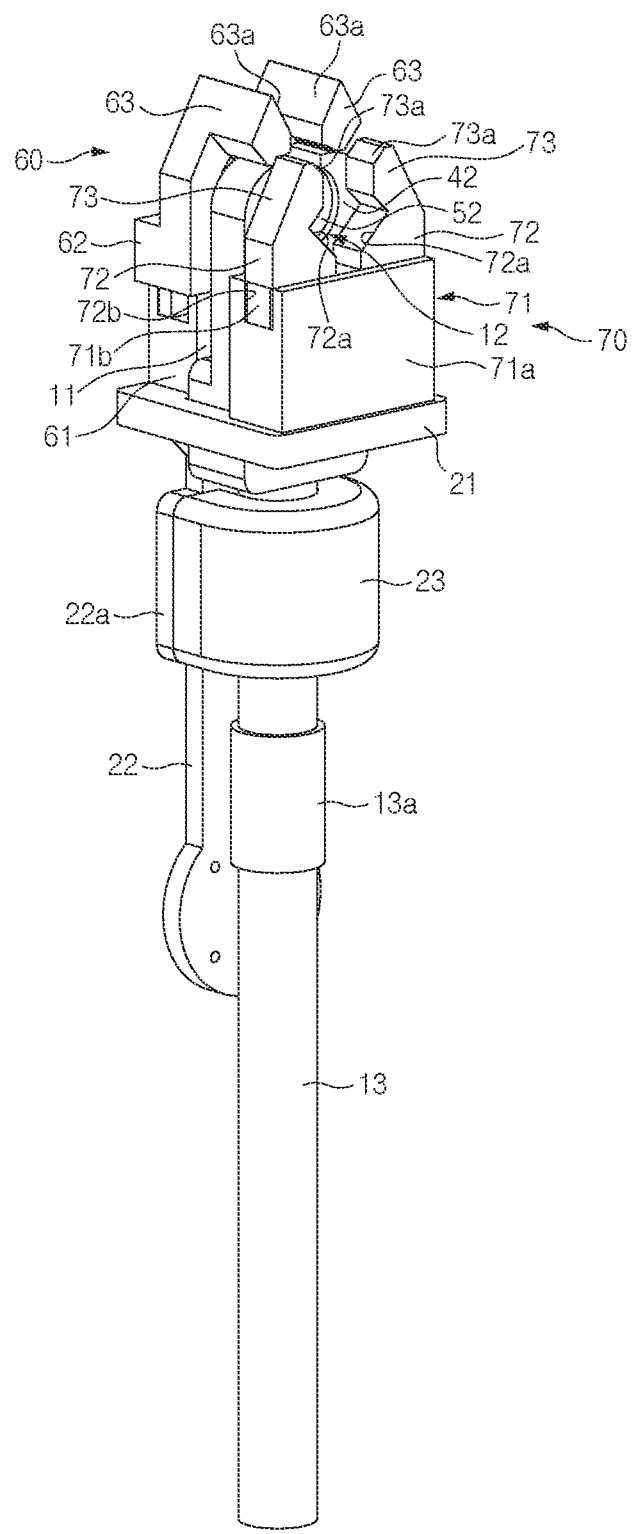
FIG. 9 illustrates a state in which a second gripper is closely mounted to a second surface of a wrench head through a bracket assembly in a power tool according to an exemplary embodiment of the present disclosure.

The wrench head 11 may have a first surface 41 facing in a first direction and a second surface 42 facing in a second direction which is opposite to the first direction. The first surface 41 and the second surface 42 of the wrench head 11 may oppose each other. The rotary socket 12 may have a first surface 51 facing in the first direction and a second surface 52 facing in the second direction which is opposite to the first direction. The first surface 51 and the second surface 52 of the rotary socket 12 may oppose each other. Referring to FIGS. 4, 5, and 6, the first surface 51 of the rotary socket 12 may be flush with the first surface 41 of the wrench head 11. Referring to FIG. 9, the second surface 52 of the rotary socket 12 may be flush with the second surface 42 of the wrench head 11.

The wrench head 11 may include a driving mechanism (not shown) provided therein. The driving mechanism may rotate the rotary socket 12 in a clockwise or counterclockwise direction. According to an exemplary embodiment, the driving mechanism may include a gear train (not shown) provided inside the wrench head 11 and a driving actuator, and the rotary socket 12 may have a plurality of teeth on an outer circumferential surface thereof, the plurality of teeth meshing with some gears of the gear train (not shown).

The wrench head 11 may be mounted on the top end of the supporting body 13, and the supporting body 13 may extend from the wrench head 11 to a predetermined length. According to an exemplary embodiment, the driving actuator may be provided in the supporting body 13.

The supporting body 13 may have a cylindrical shape having a predetermined radius, and a mounting portion 13a may be provided in the middle of the supporting body 13. An outer diameter of the mounting portion 13a may be greater than an outer diameter of the supporting body 13, and the mounting portion 13a may have a flat mounting surface 13b. The mounting portion 13a may be joined to a bracket assembly 20 to be described below.

Figure 2:
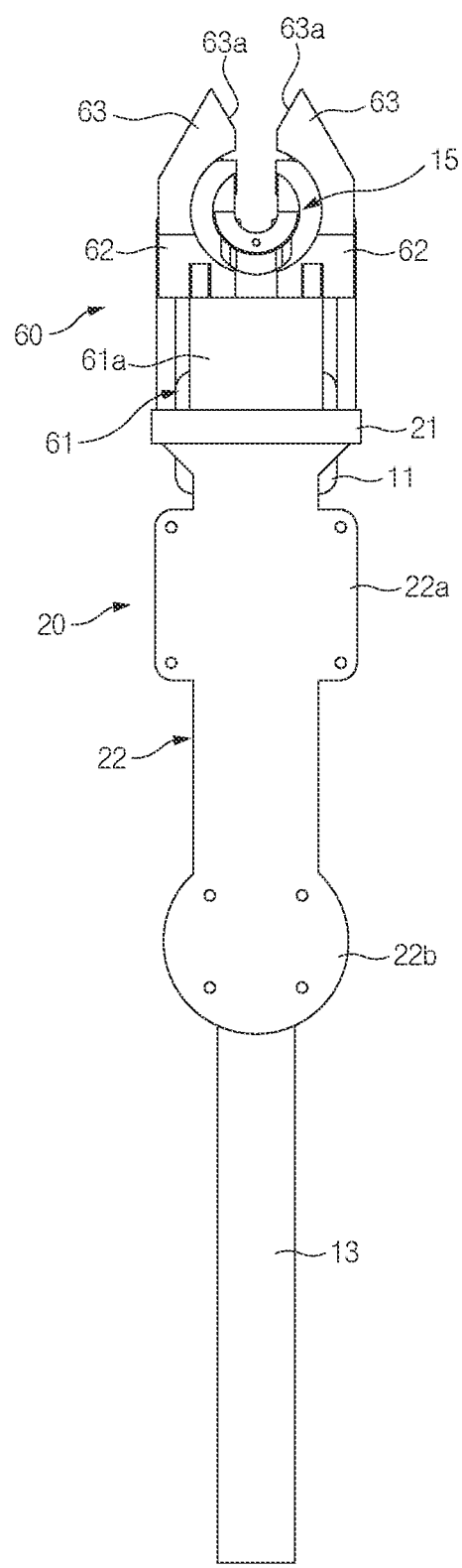
FIG. 2 illustrates a view of the power tool, which is viewed from a direction indicated by arrow A of FIG. 1.
Figure 3:
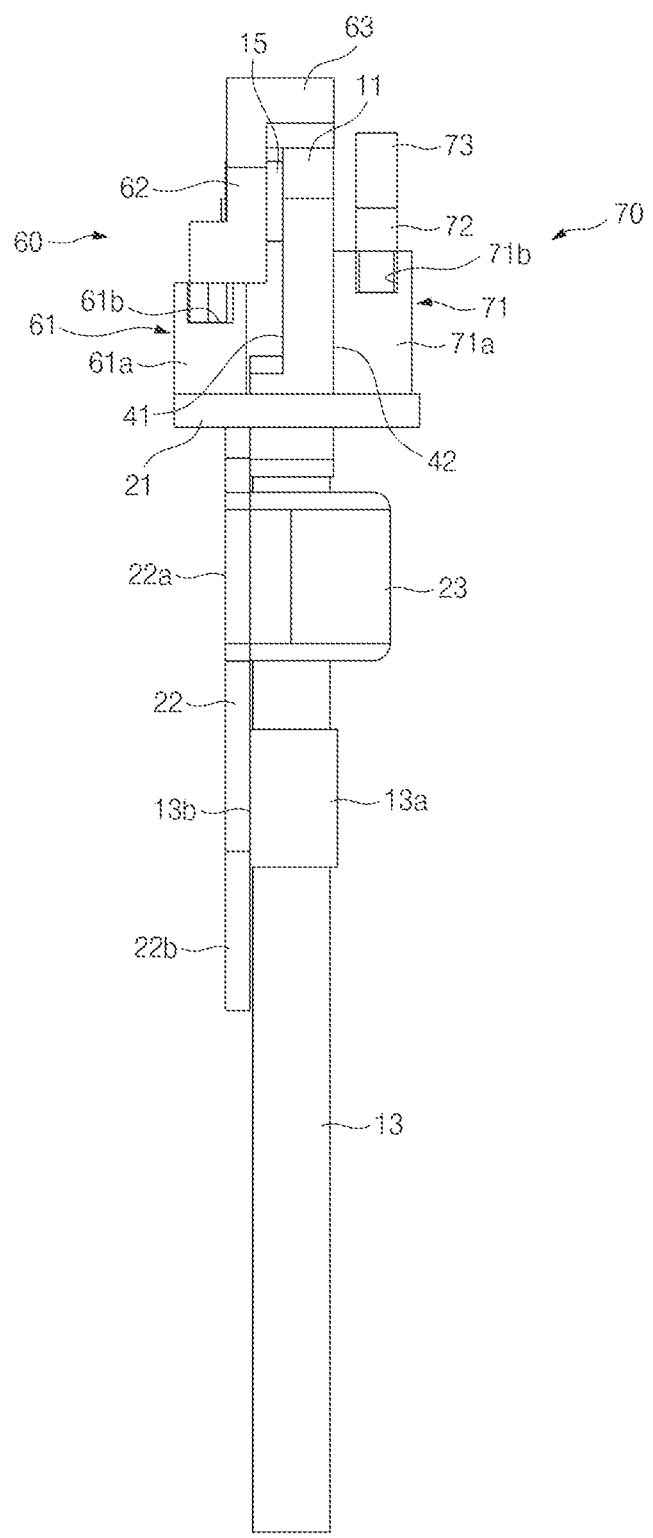
FIG. 3 illustrates a view of the power tool, which is viewed from a direction indicated by arrow B of FIG. 1.

Referring to FIGS. 1 to 3, the power tool 10 according to an exemplary embodiment of the present disclosure may be mounted on the bracket assembly 20. Referring to FIG. 5, the bracket assembly 20 may include a first bracket 21 having a slot 21a, a second bracket 22 perpendicular to the first bracket 21, and a third bracket 23 detachably mounted to the second bracket 22.

Referring to FIGS. 5 and 6, the first bracket 21 may be a flat plate having a predetermined area. Referring to FIG. 6, a lower portion of the wrench head 11 may be inserted into the slot 21a of the first bracket 21.

The second bracket 22 may be a flat plate extending from a portion of the first bracket 21 adjacent to one edge of the first bracket 21. In particular, the second bracket 22 may extend in a direction perpendicular to the first bracket 21. The mounting surface 13b of the mounting portion 13a of the supporting body 13 may be detachably mounted on a portion of the second bracket 22 through a plurality of fasteners (screws).

The second bracket 22 may have an upper mounting portion 22a and a lower mounting portion 22b. The upper mounting portion 22a may have a rectangular shape, and as illustrated in FIG. 6, the third bracket 23 may be detachably mounted to the upper mounting portion 22a through a plurality of fasteners (screws). The lower mounting portion 22b may have a circular shape, and as illustrated in FIGS. 16 and 17, the lower mounting portion 22b may be detachably mounted to an arm of a robot 9 through a plurality of fasteners (screws).

The third bracket 23 may have a U-shaped cross section to surround the supporting body 13, and the third bracket 23 may have two end portions. As illustrated in FIG. 6, the third bracket 23 may surround an upper portion of the supporting body 13, and the two end portions of the third bracket 23 may be joined to the upper mounting portion 22a of the second bracket 22 through a plurality of screws (for example, four screws). Thus, the supporting body 13 may be supported by the upper mounting portion 22a of the second bracket 22 and the third bracket 23.

Figure 17:
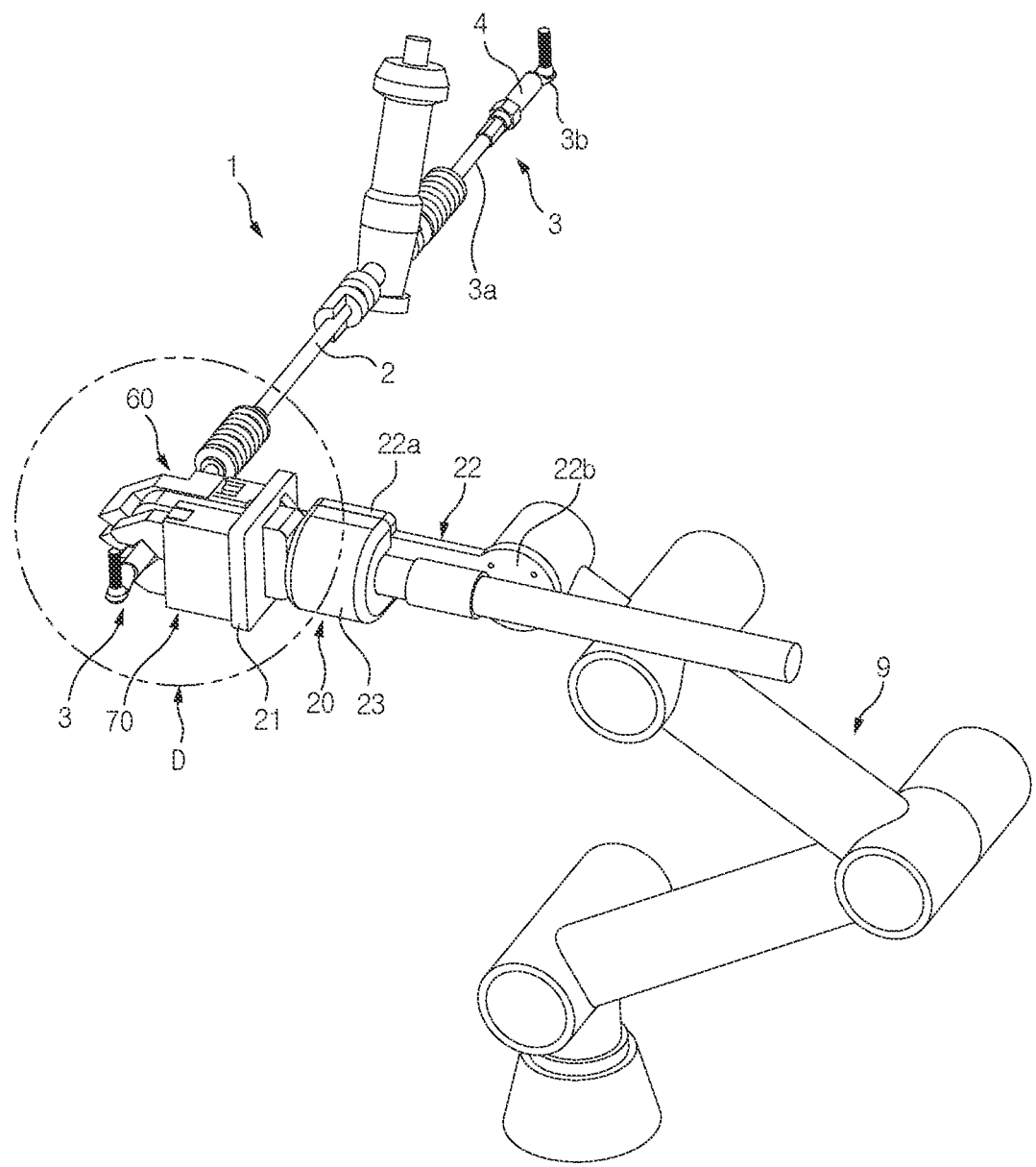
FIG. 17 illustrates a state in which a power tool according to an exemplary embodiment of the present disclosure is positioned in a tie rod assembly by a robot.

Referring to FIGS. 16 and 17, the bracket assembly 20 may be mounted on a moving mechanism such as the robot 9. Specifically, the power tool 10 may be mounted on the arm of the robot 9 through the bracket assembly 20 so that the power tool 10 may be moved by the robot 9. The power tool 10 according to an exemplary embodiment of the present disclosure may have a compact structure for gripping two or more different components as the spanner tool 15 is mounted in the rotary socket 12 of the wrench head 11, and thus the weight thereof may be relatively reduced. Accordingly, the robot 9 may be a small robot having a relatively low payload. The power tool 10 together with the small robot may be designed to have a small overall size, making it easy to install them in a narrow space of wheel alignment measuring equipment.

Figure 7:
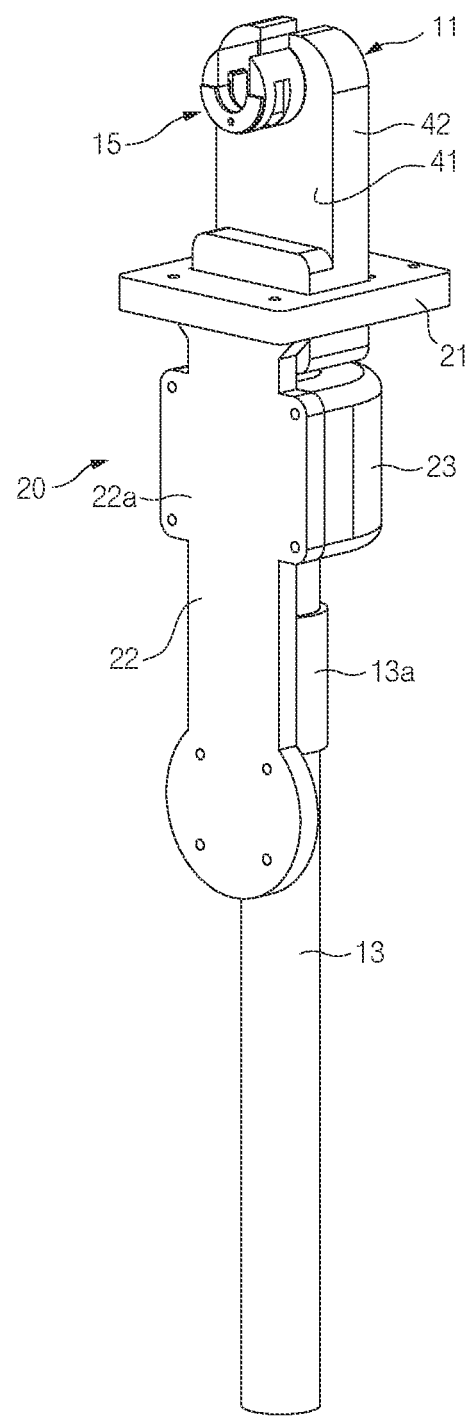
FIG. 7 illustrates a state in which a spanner tool is mounted in a rotary socket of a wrench head in a power tool according to an exemplary embodiment of the present disclosure.
Figure 8:
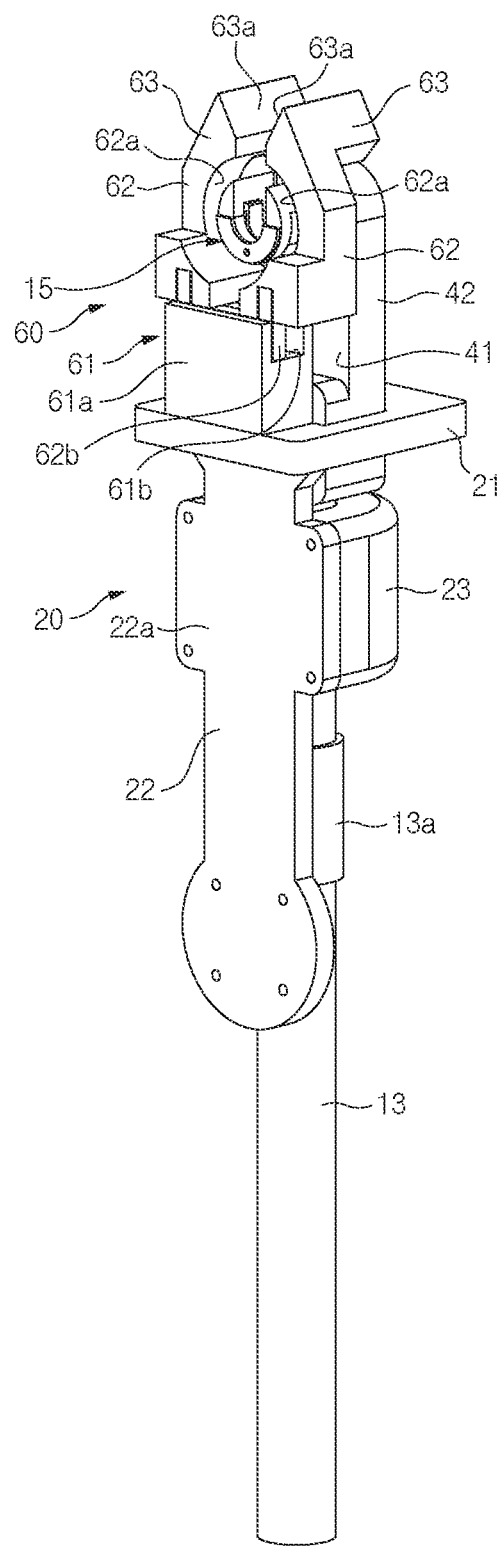
FIG. 8 illustrates a state in which a first gripper is closely mounted to a first surface of a wrench head through a bracket assembly in a power tool according to an exemplary embodiment of the present disclosure.

Referring to FIG. 7, the spanner tool 15 may be detachably mounted in the rotary socket 12 of the wrench head 11 through a plurality of fasteners (screws), and the spanner tool 15 may grip and ungrip a second component adjacent to the first component. The spanner tool 15 may rotate together with the rotary socket 12 in the same direction. A rotation axis of the spanner tool 15 may be aligned with or eccentric to a rotation axis of the rotary socket 12.

Figure 10:
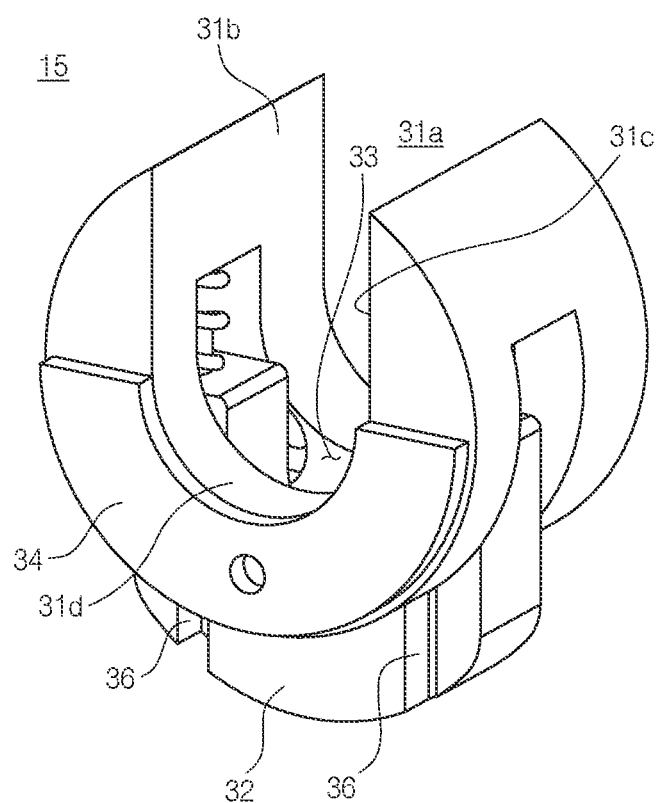
FIG. 10 illustrates a perspective view of a spanner tool of a power tool according to an exemplary embodiment of the present disclosure.
Figure 11:
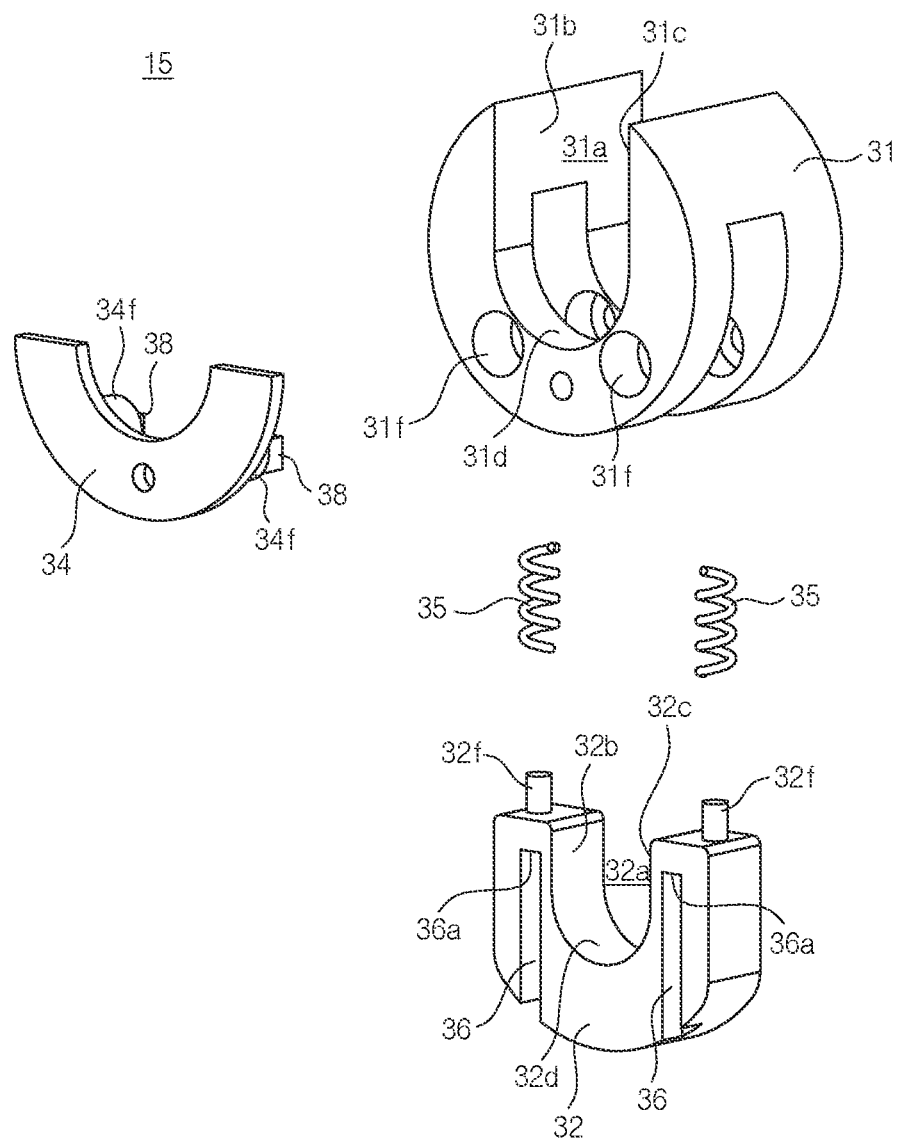
FIG. 11 illustrates an exploded perspective view of components of a spanner tool of a power tool according to an exemplary embodiment of the present disclosure.
Figure 12:
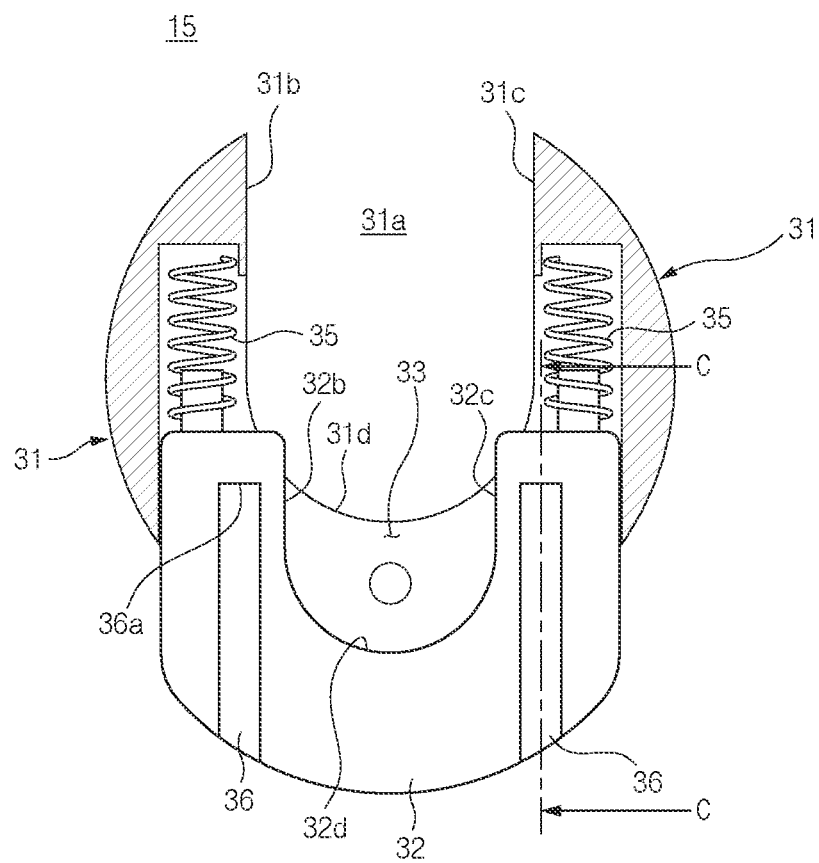
FIG. 12 illustrates a cross-sectional view of a spanner tool of a power tool according to an exemplary embodiment of the present disclosure.
Figure 13:
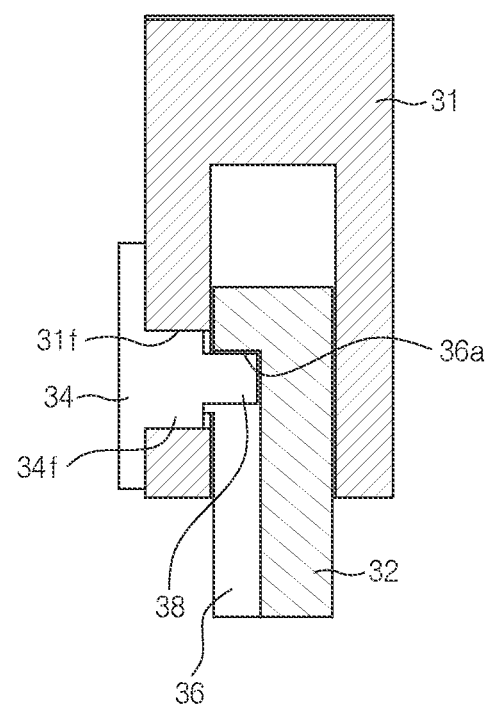
FIG. 13 illustrates a cross-sectional view, taken along line C-C of FIG. 12.

Referring to FIGS. 10 to 12, the spanner tool 15 may include a tool housing 31 mounted in the rotary socket 12, and a spanner member 32 movably mounted in the tool housing 31 to move between an ungrip position and a grip position.

The tool housing 31 may be detachably mounted on the first surface 51 of the rotary socket 12 through fasteners and/or the like. The tool housing 31 may have a second open recess 31a, and the tool housing 31 may have a circular shape similar to that of the rotary socket 12. The tool housing 31 may have two inner flat surfaces 31b and 31c and an inner curved surface 31d by which the second open recess 31a is defined. The inner curved surface 31d may connect bottom ends of the inner flat surfaces 31b and 31c so that the inner curved surface 31d and the two inner flat surfaces 31b and 31c may form a U-shape. The second open recess 31a of the tool housing 31 may be aligned with the first open recess 12a of the rotary socket 12.

The tool housing 31 may have a slot 33 receiving the spanner member 32, and the spanner member 32 may be movably received in the slot 33. The slot 33 may have a shape matching that of the spanner member 32. Accordingly, the spanner member 32 may be movably mounted in the slot 33 of the tool housing 31, and the movement of the spanner member 32 may be guided by the slot 33 so that the spanner member 32 may accurately move in the tool housing 31 between the ungrip position and the grip position.

The spanner member 32 may have a third open recess 32a, and the third open recess 32a may have a shape similar to that of the second open recess 31a of the tool housing 31. The spanner member 32 may have two inner flat surfaces 32b and 32c and an inner curved surface 32d by which the third open recess 32a is defined. The inner curved surface 32d may connect bottom ends of the two inner flat surfaces 32b and 32c so that the inner curved surface 32d and the two inner flat surfaces 32b and 32c may form a U shape, and the spanner member 32 may have two top ends. In particular, the spanner member 32 may have a substantially U-like shape outwardly. When the second component is received in the third open recess 32a, the second component may be gripped by the plurality of inner flat surfaces 32b and 32c.

When the first component and the second component have different sizes, the third open recess 32a of the spanner member 32 and the first open recess 12a of the rotary socket 12 may have different sizes. For example, when the size of the lock nut 4 (the first component) is greater than that of a flatted portion 5 of an inner tie rod 3a (the second component), the size of the first open recess 12a may be greater than that of the third open recess 32a.

The size of the third open recess 32a of the spanner member 32 may match that of the second component, and the second open recess 31a of the tool housing 31 may be larger than an outer diameter of the second component. Accordingly, the second open recess 31a of the tool housing 31 may be relatively larger than the third open recess 32a of the spanner member 32, and the second open recess 31a of the tool housing 31 may receive the second component, but may not grip the second component.

The spanner member 32 may grip and rotate the second component adjacent to the first component. For example, as illustrated in FIG. 16, the second component may be the flatted portion 5 of the inner tie rod 3a of the tie rod assembly 3 of the steering mechanism 1, and the flatted portion 5 may be a hex portion having six flat surfaces. The flatted portion 5 of the inner tie rod 3a may be received in the third open recess 32a of the spanner member 32. When the flatted portion 5 of the inner tie rod 3a is received in the third open recess 32a of the spanner member 32, the flatted portion 5 of the inner tie rod 3a may be gripped by the inner flat surfaces 32b and 32c of the spanner member 32.

Figure 14:
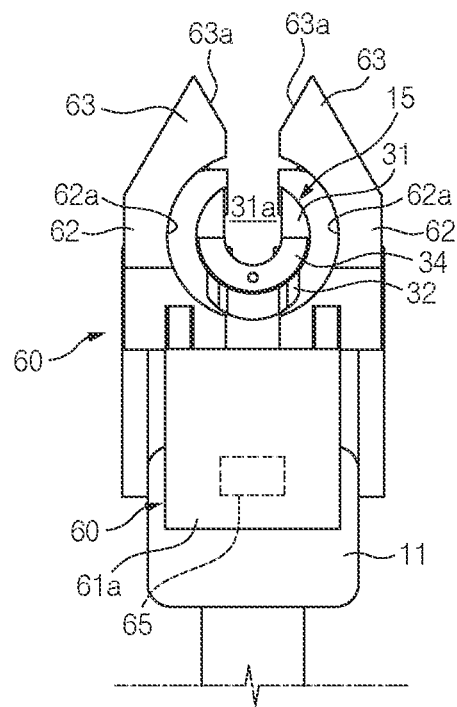
FIG. 14 illustrates a state in which a spanner member is located at an ungrip position in a tool housing of a power tool according to an exemplary embodiment of the present disclosure.
Figure 15:
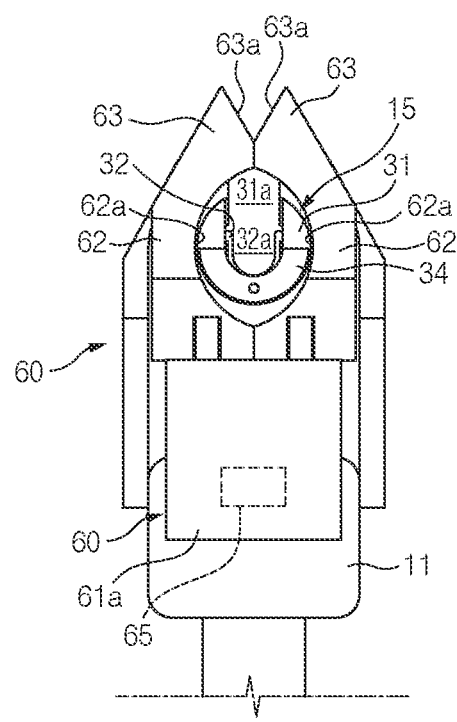
FIG. 15 illustrates a state in which the spanner member is located at grip position in a spanner tool of a power tool according to an exemplary embodiment of the present disclosure.
Figure 19:
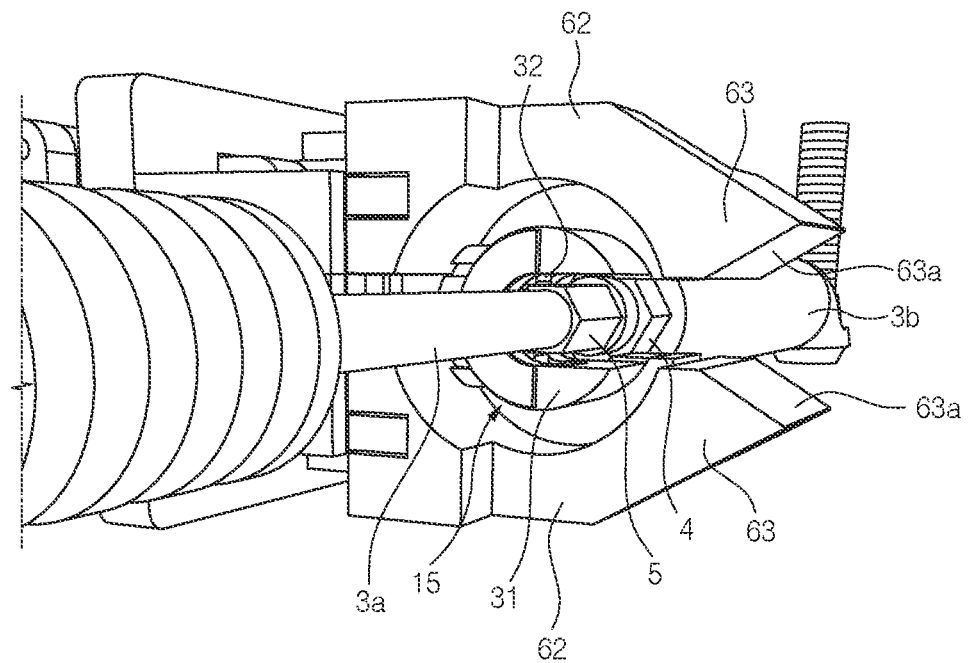
FIG. 19 illustrates a state in which a spanner tool ungrips a flatted portion of an inner tie rod, which is viewed from a direction indicated by arrow E of FIG. 18.
Figure 20:
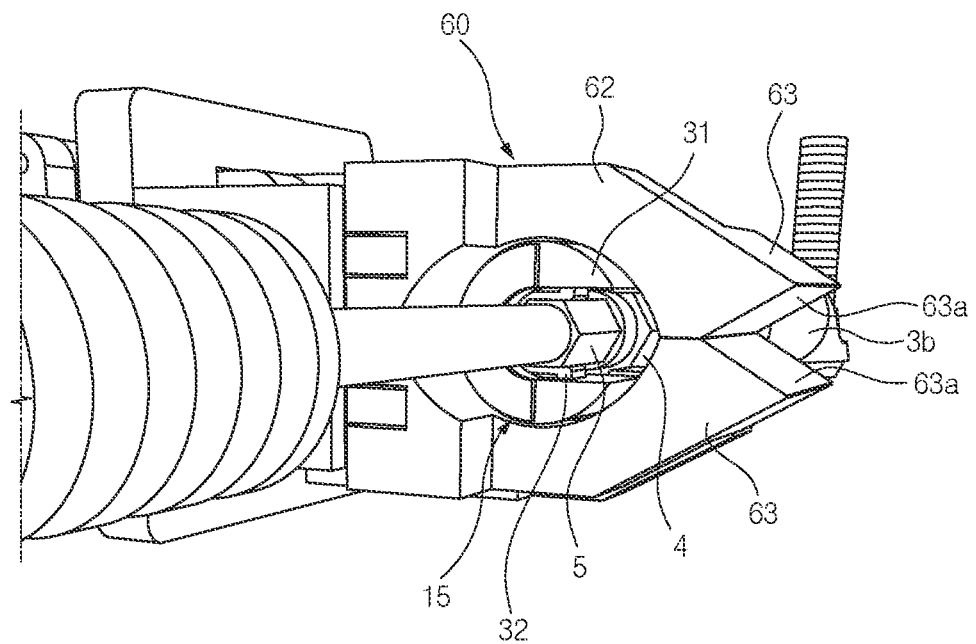
FIG. 20 illustrates a state in which a spanner tool grips a flatted portion of an inner tie rod, which is viewed from a direction indicated by arrow E of FIG. 18.

Specifically, the spanner member 32 may move between the released or ungrip position (see FIGS. 14 and 19) in which the spanner member 32 ungrips/releases the second component and the grip position (see FIGS. 15 and 20) in which the spanner member 32 grips the second component. Referring to FIGS. 14 and 19, when the spanner member 32 is in the ungrip position, the third open recess 32a of the spanner member 32 may be out of the second open recess 31a of the tool housing 31, and at least a portion of the spanner member 32 may protrude from an outer circumferential surface of the tool housing 31. Referring to FIGS. 15 and 20, when the spanner member 32 is in the grip position, the spanner member 32 may move toward the center of the tool housing 31 so that the third open recess 32a of the spanner member 32 may be positioned within the second open recess 31a of the tool housing 31, and a bottom end of the spanner member 32 may be completely received in the slot 33 of the tool housing 31. When the second component is received in the second open recess 31a of the tool housing 31, as the spanner member 32 moves between the ungrip position and the grip position, the third open recess 32a of the spanner member 32 may ungrip and grip the second component received in the second open recess 31a.

The spanner tool 15 may further include a spring 35 causing the spanner member 32 to be biased to the ungrip position. Thus, the spanner tool 15 may be maintained in the ungrip position by the spring 35 when stored or ready to be used, and the spanner member 32 may move from the ungrip position to the grip position only when it is necessary to grip the second component so that the spanner member 32 may accurately grip the second component.

According to an exemplary embodiment, two springs 35 may be symmetrically disposed in the slot 33 of the tool housing 31, and the two springs 35 may provide a spring force that pushes the spanner member 32 toward the ungrip position. The spanner member 32 may have two retainer projections 32f protruding from the top ends thereof, and bottom ends of the springs 35 may be supported by the corresponding retainer projections 32f, respectively.

Referring to FIGS. 10 and 11, the spanner tool 15 may further include a stopper member 34 mounted in the tool housing 31. The stopper member 34 may restrict the spanner member 32 to the ungrip position, and the spanner member 32 may be prevented from being completely separated from the slot 33 of the tool housing 31. The spanner member 32 may have a guide groove 36, and the guide groove 36 may extend in a direction of movement of the spanner member 32. A stopper surface 36a may be provided on a top end of the guide groove 36. The stopper member 34 may have a stopper projection 38 received in the guide groove 36 of the spanner member 32. As the stopper projection 38 comes into contact with the stopper surface 36a of the spanner member 32, the spanner member 32 may be restricted to the ungrip position, and thus the spanner member 32 may be prevented from being completely separated from the slot 33 of the tool housing 31.

The stopper member 34 may have a mounting projection 34f, and the stopper projection 38 may protrude from the mounting projection 34f. The tool housing 31 may have a mounting hole 31f, and the mounting hole 31f may directly communicate with the slot 33. The guide groove 36 of the spanner member 32 may face the mounting hole 31f As the mounting projection 34f of the stopper member 34 is press-fitted into the mounting hole 31f of the tool housing 31, the stopper projection 38 may be accurately received in an upper portion of the guide groove 36 of the spanner member 32, and the stopper member 34 may be easily and accurately mounted to the tool housing 31 through the mounting projection 34f and the mounting hole 31f.

In addition, the stopper member 34 and the tool housing 31 may be fastened by one or more fasteners (such as screws) whereby the stopper member 34 may be more firmly mounted to the tool housing 31.

According to an exemplary embodiment, the spanner member 32 may have two guide grooves 36. The two guide grooves 36 may be provided symmetrically on the left and right of the spanner member 32, and accordingly the spanner member 32 may have two stopper surfaces 36a. The stopper member 34 may have two mounting projections 34f, and accordingly the stopper member 34 may have two stopper projections 38. As the two stopper projections 38 come into contact with the two stopper surfaces 36a, respectively, the spanner member 32 may be stably supported by the stopper member 34. The tool housing 31 may have two mounting holes 31f, and the two mounting holes 31f may be provided symmetrically to the tool housing 31. The two mounting holes 31f may communicate with the slot 33. The mounting projections 34f of the stopper member 34 may be press-fitted into the mounting holes 31f of the tool housing 31, respectively.

The power tool 10 may further include a first gripper 60 and a second gripper 70 facing each other with the wrench head 11 disposed therebetween. The first gripper 60 may be adjacent to the first surface 41 of the wrench head 11, and the second gripper 70 may be adjacent to the second surface 42 of the wrench head 11. The first gripper 60 and the second gripper 70 may be disposed on a top surface of the first bracket 21 of the bracket assembly 20.

The first gripper 60 may selectively grip the outer circumferential surface of the spanner tool 15 so that it may move the spanner member 32 toward the center of the tool housing 31. Specifically, when the first gripper 60 grips the entirety of the outer circumferential surface of the spanner tool 15, the spanner member 32 protruding from the outer circumferential surface of the tool housing 31 may move toward the center of the tool housing 31 by the gripping of the first gripper 60.

Specifically, the first gripper 60 may include a first actuator 61, a pair of first grip members 62 moved by the first actuator 61, and a pair of first guide portions 63 provided on top ends of the pair of first grip members 62, respectively.

The first actuator 61 may be at least one of an electric actuator, a pneumatic actuator, and a hydraulic actuator. The first actuator 61 may include a first actuator housing 61a and a driving mechanism (not shown) provided in the first actuator housing 61a. The first actuator housing 61a may be fixed to the top surface of the first bracket 21. In addition, a guide groove 61b may be provided in an upper portion of the first actuator housing 61a, and the guide groove 61b may guide the movement of the pair of first grip members 62.

The pair of first grip members 62 may face each other to surround the outer circumferential surface of the spanner tool 15. Each first grip member 62 may have a semicircular grip recess 62a matching a half of the spanner tool 15. The grip recesses 62a of the pair of first grip members 62 may form a circular shape matching that of the outer circumferential surface of the spanner tool 15. In addition, each first grip member 62 may have a guide projection 62b protruding toward the first actuator housing 61a, and the guide projection 62b of the first grip member 62 may move along the guide groove 61b of the first actuator housing 61a.

The pair of first grip members 62 may be moved by the first actuator 61 between an ungrip position (see FIG. 14) in which the first grip members 62 ungrip the outer circumferential surface of the spanner tool 15 and a grip position (see FIG. 15) in which the first grip members 62 grip the outer circumferential surface of the spanner tool 15.

Referring to FIG. 14, when the pair of first grip members 62 are in the ungrip position, the pair of first grip members 62 may move away from each other so that the grip recesses 62a of the first grip members 62 may be spaced apart from the outer circumferential surface of the spanner tool 15, and thus the pair of first grip members 62 may ungrip the outer circumferential surface of the spanner tool 15. When the pair of first grip members 62 ungrip the outer circumferential surface of the spanner tool 15, the spanner member 32 may move toward the outside of the tool housing 31 by the spring force of the spring 35 so that the spanner member 32 may move toward the ungrip position.

Referring to FIG. 15, when the pair of first grip members 62 are in the grip position, the pair of first grip members 62 may move close to each other so that the grip recesses 62a of the first grip members 62 may contact the outer circumferential surface of the spanner tool 15, and thus the pair of first grip members 62 may grip the outer circumferential surface of the spanner tool 15. When the pair of first grip members 62 grip the outer circumferential surface of the spanner tool 15, the spanner member 32 may move toward the center of the tool housing 31 so that the spanner member 32 may move toward the grip position. Here, the spring 35 may be compressed by the spanner member 32.

Each first guide portion 63 may be provided on the top end of the each of the first grip members 62 to form a unitary one-piece structure, and each first guide portion 63 may have a first tapered surface 63a guiding the second component gripped by the spanner member 32. Accordingly, the second component may be accurately guided to the spanner member 32 through the first tapered surfaces 63a of the first guide portions 63, and thus the spanner member 32 may accurately grip the second component.

Referring to FIGS. 1 and 3, each first guide portion 63 may extend from the top end of each of the first grip members 62 to cover the top of the wrench head 11. As the first guide portions 63 extend from the top ends of the first grip members 62 to the top of the wrench head 11, the second component may be guided toward the spanner member 32 and the first component may also be guided toward the rotary socket 12. In particular, an area of the first tapered surfaces 63a may relatively increase, and thus the first component and the second component may be accurately positioned.

The first gripper 60 may further include a sensor 65 determining whether the spanner member 32 accurately grips the second component. The sensor 65 may be embedded in the first actuator housing 61a. According to an exemplary embodiment, the sensor 65 may be a current sensor, and the current sensor may sense a current value output as the pair of first grip members 62 grip the spanner tool 15 and the spanner member 32 grips the second component, thereby determining whether the spanner member 32 accurately grips the second component. According to another exemplary embodiment, the sensor 65 may be a force sensor, and the force sensor may sense a force output as the pair of first grip members 62 grip the spanner tool 15 and the spanner member 32 grips the second component, thereby determining whether the spanner member 32 accurately grips the second component.

The second gripper 70 may grip and ungrip a third component adjacent to the first component gripped by the rotary socket 12 of the wrench head 11, and the third component may be located on the opposite side of the second component. That is, the second component and the third component may face each other with the first component placed therebetween.

When the second gripper 70 grips the third component, the rotary socket 12 of the wrench head 11 may rotate the first component more accurately and stably. For example, as illustrated in FIG. 16, the third component may be an outer tie rod 3b of the tie rod assembly 3 of the steering mechanism 1. When the second gripper 70 grips the outer tie rod 3*b*, the rotary socket 12 of the wrench head 11 may rotate the lock nut 4 accurately.

Specifically, the second gripper 70 may include a second actuator 71, a pair of second grip members 72 moved by the second actuator 71, and a pair of second guide portions 73 provided on a top end of each of the pair of second grip members 72.

The second actuator 71 may be at least one of an electric actuator, a pneumatic actuator, and a hydraulic actuator. The second actuator 71 may include a second actuator housing 71*a*, and a driving mechanism (not shown) provided in the second actuator housing 71*a*. The second actuator housing 71*a* may be mounted on the top surface of the first bracket 21. In addition, a guide groove 71*b* may be provided in an upper portion of the second actuator housing 71*a*, and the guide groove 71*b* may guide the movement of the pair of second grip members 72.

The pair of second grip members 72 may face each other to surround an outer surface of the third component. Each second grip member 72 may have a grip recess 72*a* corresponding to the outer surface of the third component. The grip recesses 72*a* of the pair of second grip members 72 may form a triangular shape to match the outer surface of the third component. In addition, each second grip member 72 may have a guide projection 72*b* protruding toward the second actuator housing 71*a*, and the guide projection 72*b* of the second grip member 72 may move along the guide groove 71*b* of the second actuator housing 71*a*.

The pair of second grip members 72 may move between an ungrip position (see a solid line of FIG. 18) in which the second grip members 72 ungrip the outer surface of the third component and a grip position (see a dashed-dotted line of FIG. 18) in which the second grip members 72 grip the outer surface of the third component.

Figure 18:
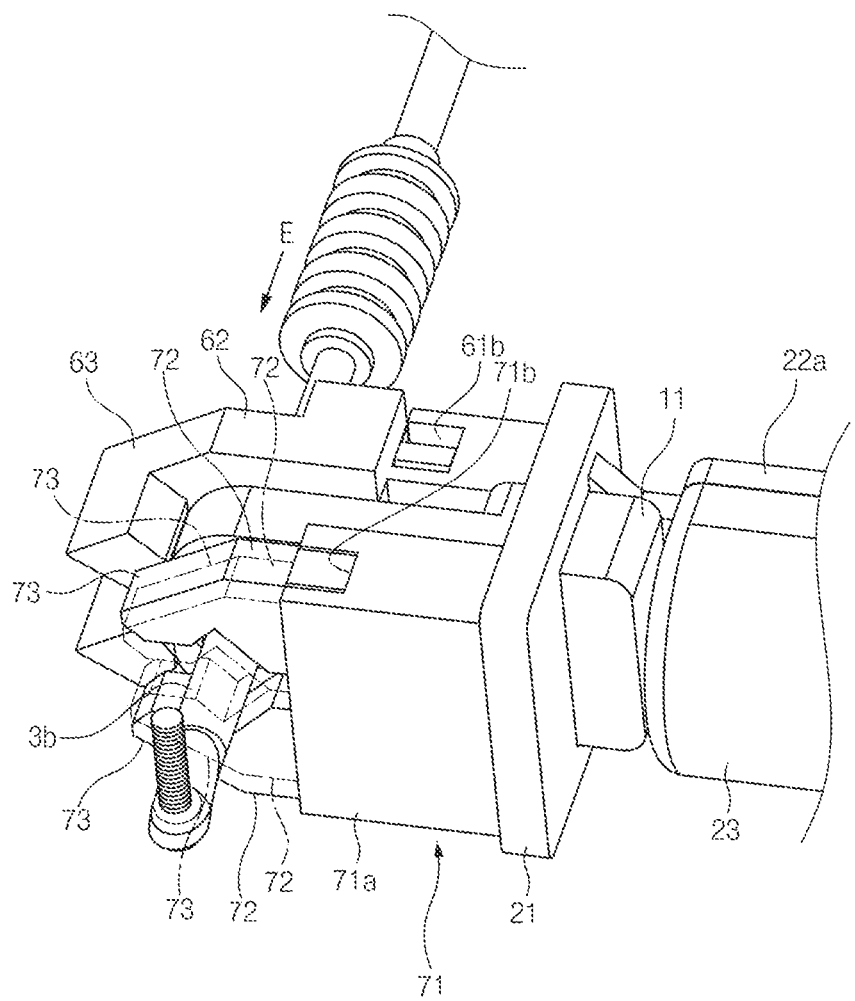
FIG. 18 illustrates an enlarged view of portion D of FIG. 17.

Referring to the solid line of FIG. 18, when the pair of second grip members 72 are in the ungrip position, the pair of second grip members 72 may move away from each other so that the second grip members 72 may be spaced apart from the outer surface of the outer tie rod 3*b* (the third component), and thus the pair of second grip members 72 may ungrip the outer surface of the outer tie rod 3*b*.

Referring to the dashed-dotted line of FIG. 18, when the pair of second grip members 72 are in the grip position, the pair of second grip members 72 may move close to each other so that the grip recesses 72*a* of the second grip members 72 may contact the outer surface of the outer tie rod 3*b* (the third component, and thus the pair of second grip members 72 may grip the outer surface of the outer tie rod 3*b*.

Each second guide portion 73 may be provided on the top end of each of the second grip members 72 to form a unitary one-piece structure, and each second guide portion 73 may have a second tapered surface 73*a* guiding the third component. Accordingly, the third component may be accurately guided and positioned between the pair of second grip members 72 through the second tapered surfaces 73*a* of the second guide portions 73.

Referring to FIGS. 16 and 17, the power tool 10 according to an exemplary embodiment of the present disclosure may be mounted on the robot 9 through the bracket assembly 20, and the power tool 10 may move away from or close to various objects by the movement of the robot 9.

Referring to FIGS. 16 to 20, the power tool 10 according to an exemplary embodiment of the present disclosure may be a toe adjustment tool adjusting toe settings by adjusting lengths of the tie rod assemblies 3 of the steering mechanism 1.

The steering mechanism 1 may include a steering center link or steering rack and pinion 2, and the pair of tie rod assemblies 3 pivotally connected to both ends of the steering rack and pinion 2. Each tie rod assembly 3 may transmit a force from the steering rack and pinion 2 to a knuckle of a vehicle wheel.

Referring to FIG. 16, each tie rod assembly 3 may include the inner tie rod 3*a* and the outer tie rod 3*b*. The inner tie rod 3*a* may have external threads 3*c* and a flatted portion 5 adjacent to the external threads 3*c*, and the flatted portion 5 may be a hex portion having six flat surfaces. The outer tie rod 3*b* may have internal threads 3*d* provided on an inner circumference surface thereof and a square-shaped protrusion 3*f*. The external threads 3*c* of the inner tie rod 3*a* may be screwed into the internal threads 3*d* of the outer tie rod 3*b*. As the external threads 3*c* of the inner tie rod 3*a* move along an axial direction of the internal threads 3*d* of the outer tie rod 3*b*, the overall length of each tie rod assembly may be adjusted. When the lock nut 4 is screwed to the external threads 3*c* of the inner tie rod 3*a*, and the lock nut 4 locks the external threads 3*c* of the inner tie rod 3*a* and the internal threads 3*d* of the outer tie rod 3*b*, the external threads 3*c* of the inner tie rod 3*a* and the internal threads 3*d* of the outer tie rod 3*b* may be prevented from rotating relative to each other. That is, when the lock nut 4 is tightened, the external threads 3*c* of the inner tie rod 3*a* and the internal threads 3*d* of the outer tie rod 3*b* may be locked, and when the lock nut 4 is loosened, the external threads 3*c* of the inner tie rod 3*a* and the internal threads 3*d* of the outer tie rod 3*b* may be unlocked. The lock nut 4 may have a flatted portion such as a hex portion having six flat surfaces. By adjusting the length of each tie rod assembly 3, the toe settings may be adjusted. Specifically, after the lock nut 4 is loosened, the external threads 3*c* of the inner tie rod 3*a* may move along the axial direction of the internal threads 3*d* of the outer tie rod 3*b* by the rotation of the inner tie rod 3*a* so that the length of the tie rod assembly 3 may be adjusted. Then, as the lock nut 4 is tightened again, the adjusted length of the tie rod assembly 3 may be set.

When the pair of second grip members 72 are in the grip position, the grip recesses 72*a* of the second grip members 72 may grip the square-shaped protrusion 3*f* of the outer tie rod 3*b*. When the grip recesses 72*a* of the second grip members 72 grip the square-shaped protrusion 3*f* of the outer tie rod 3*b*, the lock nut is tightened or loosened, the outer tie rod 3*b* may be prevented from rotating.

FIGS. 17 to 20 illustrate a process of adjusting the length of the tie rod assembly 3 using the power tool 10 according to an exemplary embodiment of the present disclosure.

Referring to FIG. 17, the power tool 10 according to an exemplary embodiment of the present disclosure may move close to each tie rod assembly 3 by the robot 9. When the lock nut 4 of the tie rod assembly 3 is received in the rotary socket 12 of the wrench head 11 of the power tool 10, the lock nut 4 may be gripped by the inner flat surfaces 12*b*, 12*c*, 12*d*, and 12*e* of the rotary socket 12.

Referring to FIG. 18, in a state in which the rotary socket 12 grips the lock nut 4, the second gripper 70 may grip the outer surface of the outer tie rod 3*b*, and thus the rotation of the outer tie rod 3*b* may be prevented by the second gripper 70. In this state, as the rotary socket 12 rotates the lock nut 4 in a direction of loosening the lock nut 4, the lock nut 4 may be loosed, and thus the external threads 3c of the inner tie rod 3a and the internal threads 3d of the outer tie rod 3b may be unlocked.

Referring to FIG. 19, when the lock nut 4 is received in the rotary socket 12, the flatted portion 5 of the inner tie rod 3a may be received in the spanner tool 15. Referring to FIG. 20, as the first gripper 60 grips the spanner tool 15, the spanner member 32 of the spanner tool 15 may grip the flatted portion 5 of the inner tie rod 3a.

After the lock nut 4 is loosened, the second gripper 70 may ungrip the outer surface of the outer tie rod 3b. Then, as the first gripper 60 grips the spanner tool 15 while the rotary socket 12 is rotating slowly, the first tapered surfaces 63a of the first guide portions 63 of the first gripper 60 may guide the flatted portion 5 of the inner tie rod 3a, and accordingly the flatted portion 5 of the inner tie rod 3a may be accurately positioned in the third open recess 32a of the spanner member 32 of the spanner tool 15, and the inner flat surfaces 32b and 32c of the spanner member 32 may accurately grip the flatted portion 5 of the inner tie rod 3a. After the spanner member 32 grips the flatted portion 5 of the inner tie rod 3a, the rotary socket 12 may rotate in a clockwise or counterclockwise direction so that the external threads 3c of the inner tie rod 3a may move along the axial direction of the internal threads 3d of the outer tie rod 3b, and thus the length of the tie rod assembly 3 may be adjusted.

After the length of the tie rod assembly 3 is adjusted, the first gripper 60 may ungrip the spanner tool 15 so that the spanner member 32 of the spanner tool 15 may ungrip the flatted portion 5 of the inner tie rod 3a. Thereafter, as the rotary socket 12 rotates in a direction of tightening the lock nut 4, the lock nut 4 may be tightened, and accordingly the external threads 3c of the inner tie rod 3a and the internal threads 3d of the outer tie rod 3b may be locked.

Figure 21:
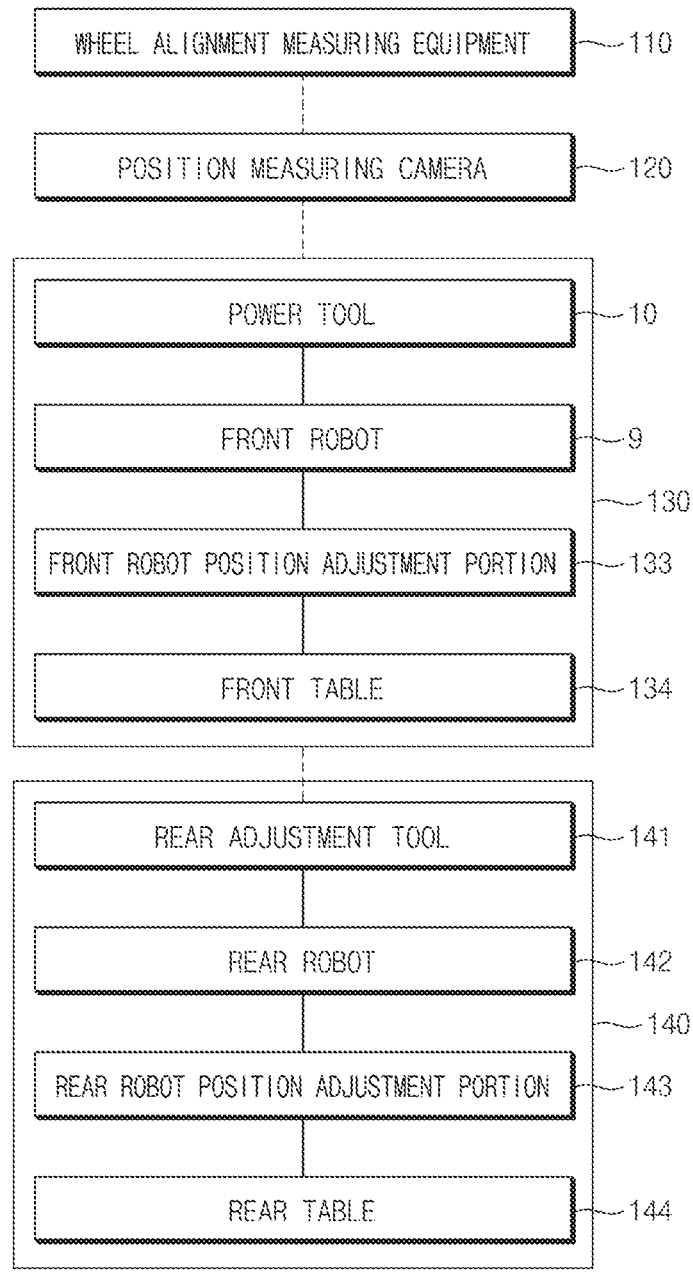
FIG. 21 illustrates a block diagram of a wheel alignment automatic adjustment system of a vehicle to which a power tool according to an exemplary embodiment of the present disclosure is applied.

FIG. 21 illustrates a block diagram of a wheel alignment automatic adjustment system 100 of a vehicle to which the power tool 10 according to an exemplary embodiment of the present disclosure is applied.

Referring to FIG. 21, the wheel alignment automatic adjustment system 100 may include a wheel alignment measuring equipment 110, a position measuring camera 120, a front wheel adjusting mechanism 130, and a rear wheel adjusting mechanism 140.

The wheel alignment measuring equipment 110 may measure a wheel angle, a wheel alignment state, toe and camber alignment, and the like using a contact sensor (such as a contactor) or a non-contact sensor (such as a laser sensor).

The position measuring camera 120 may measure the positions of various components of the tie rod assembly 3 so that the power tool 10 may be accurately positioned with respect to the tie rod assembly 3. In particular, the position measuring camera 120 may accurately measure the position of the external threads 3c of the inner tie rod 3a so that the spanner tool 15 may accurately grip the flatted portion 5 of the inner tie rod 3a.

The front wheel adjusting mechanism 130 may include the power tool 10, a front robot 9 on which the power tool 10 is mounted, a front robot position adjustment portion 133 adjusting the position of the front robot 9, and a front table 134 supporting the front robot position adjustment portion 133.

As described above, the power tool 10 may adjust the length of the tie rod assembly 3, and the front robot 9 may position the power tool 10 on the tie rod assembly 3 through various robot motions. The front robot position adjustment portion 133 may adjust the position of the front robot 9 in three axial directions using a three-dimensional Cartesian coordinate system. The front table 134 may support the front robot 9. In particular, the front robot position adjustment portion 133 may move on the front table 134. When the power tool 10 malfuctions, the front robot 9 may move to an edge of the front table 134 through the front robot position adjustment portion 133, and an operator may manually adjust the length of the tie rod assembly 3.

The rear wheel adjusting mechanism 140 may include a rear adjustment tool 141, a rear robot 142 on which the rear adjustment tool 141 is mounted, a rear robot position adjustment portion 143 adjusting the position of the rear robot 142, and a rear table 144 supporting the rear robot position adjustment portion 143.

The rear adjustment tool 141 may adjust the camber and toe of a rear wheel, and the rear robot 142 may position the rear adjustment tool 141 on the tie rod assembly of the rear wheel through various robot motions. The rear robot position adjustment portion 143 may adjust the position of the rear robot 142 in three axial directions using a three-dimensional Cartesian coordinate system. The rear table 144 may support the rear robot 142. In particular, the rear robot position adjustment portion 143 may move on the rear table 144. When the rear adjustment tool 141 malfuctions, the rear robot 142 may move to an edge of the rear table 144 through the rear robot position adjustment portion 143, and the operator may manually adjust and set the camber and toe of the rear wheel.

As set forth above, the power tool according to exemplary embodiments of the present disclosure may have a relatively lightweight and compact structure by simplifying its structure for selective grip and rotation with respect to different components. In particular, since the power tool has a relatively lightweight and simple structure, a small robot having a relatively low payload may be used for the mounting of the power tool. Accordingly, the power tool together with the small robot may be designed to have a small overall size, making it easy to install them in a narrow space of the wheel alignment measuring equipment.

In addition, the simple structure of the power tool may make maintenance and repair easy and relatively reduce a time required for maintenance and repair. Since the number of components required is reduced, the overall structure of the power tool may be simplified, and thus the possibility of failure may be relatively low and installation cost may be reduced. In particular, when the wheel alignment is performed by the power tool according to exemplary embodiments of the present disclosure, the wheel alignment time may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A power tool, comprising:
a wrench head having a rotary socket; and
a spanner tool mounted in the rotary socket;
wherein the rotary socket is configured to grip a first component and the spanner tool is configured to grip a second component, the first component being adjacent to the second component.

2. The power tool according to claim 1, wherein the rotary socket has a first open recess defined by a plurality of inner flat surfaces, and the first component has a plurality of flat surfaces.

3. The power tool according to claim 2, wherein the spanner tool includes:
a tool housing mounted in the rotary socket; and
a spanner member movably mounted in the tool housing configured to move between an ungrip position in which the spanner member releases the second component, and a grip position in which the spanner member grips the second component.

4. The power tool according to claim 3, wherein the tool housing has a second open recess aligned with the first open recess, and the spanner member has a third open recess, wherein the second open recess is larger than the third open recess.

5. The power tool according to claim 3, wherein the tool housing has a slot in which the spanner member is movably received, and the slot has a shape corresponding to a shape of the spanner member.

6. The power tool according to claim 5, wherein the spanner tool further includes a stopper member configured to restrict the spanner member to the ungrip position, and the stopper member is mounted to the tool housing.

7. The power tool according to claim 6, wherein the spanner member has a guide groove, the guide groove has a stopper surface provided on a top end, and the stopper member has a stopper projection received in the guide groove of the spanner member.

8. The power tool according to claim 7, wherein the stopper member has a mounting projection, the stopper projection protrudes from the mounting projection, the tool housing has a mounting hole into which the mounting projection of the stopper member is fitted, the mounting hole communicates with the slot, and the guide groove partially overlaps the mounting hole.

9. The power tool according to claim 3, further comprising a first gripper configured to grip and release an outer circumferential surface of the spanner tool, wherein as the first gripper ungrips the outer circumferential surface of the spanner tool, the spanner member moves toward the ungrip position, and as the first gripper grips the outer circumferential surface of the spanner tool, the spanner member moves toward the grip position.

10. The power tool according to claim 9, wherein the first gripper includes a first actuator and a pair of first grip members moved by the first actuator, and the pair of first grip members move between an ungrip position in which the first grip members release the outer circumferential surface of the spanner tool, and a grip position in which the first grip members grip the outer circumferential surface of the spanner tool.

11. The power tool according to claim 10, wherein the pair of first grip members face each other to surround the outer circumferential surface of the spanner tool.

12. The power tool according to claim 10, wherein the first gripper further includes a first guide portions provided on each top end of each of the pair of first grip members.

13. The power tool according to claim 12, wherein each first guide portion and a corresponding first grip member form a unitary one-piece structure, and each first guide portion has a first tapered surface guiding the second component gripped by the spanner member.

14. The power tool according to claim 13, wherein each first guide portion extends from the top end of each first grip member to cover the top of the wrench head.

15. The power tool according to claim 1, further comprising a second gripper gripping and releasing a third component positioned adjacent to the first component.

16. The power tool according to claim 15, wherein the second gripper includes a second actuator and a pair of second grip members configured to be moved by the second actuator.

17. The power tool according to claim 16, wherein the pair of second grip members face each other to surround an outer surface of the third component.

18. The power tool according to claim 16, wherein the second gripper further includes a second guide portions provided on each top end of each of the second grip members, each second guide portion and a corresponding second grip member form a unitary one-piece structure, and each second guide portion has a second tapered surface guiding the third component.

19. The power tool according to claim 3, wherein the spanner tool further includes a spring configured to bias the spanner member to the ungrip position.

20. The power tool according to claim 1, further comprising a supporting body extending from the wrench head, wherein the wrench head and the supporting body are mounted on an arm of a robot through a bracket assembly.

* * * * *